Oct. 1, 1968  C. B. FITES  3,403,699

SUPPLY AND EXHAUST TYPE CONTROL VALVE

Filed Sept. 9, 1965

INVENTOR
CYRIL B. FITES
BY
Joseph E. Pepin.

United States Patent Office 3,403,699
Patented Oct. 1, 1968

3,403,699
SUPPLY AND EXHAUST TYPE CONTROL VALVE
Cyril B. Fites, Florissant, Mo., assignor to Wagner Electric
Corporation, a corporation of Delaware
Filed Sept. 9, 1965, Ser. No. 486,176
24 Claims. (Cl. 137—627.5)

ABSTRACT OF THE DISCLOSURE

A control valve comprising a pair of application means movable in one direction to effect the application through said control valve of fluid pressure supplied thereto and in another direction to isolate the supplied and applied fluid pressures, and means for following engagement with one of said application means to effect reduction of the applied fluid pressure upon movement of said pair of application means in the other direction.

Figure 1:
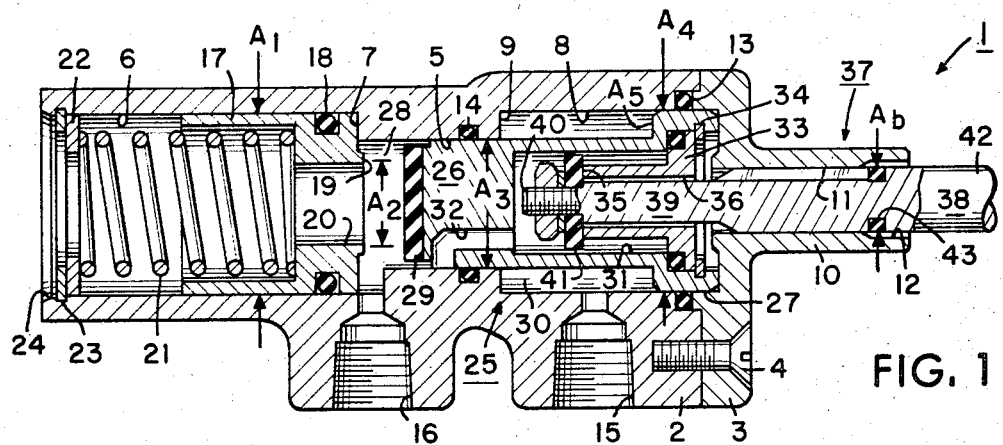

This invention relates to control valves and in particular to those having push-pull type actuation.

In the past, a well-known device for effecting the energization of vehicle brakes in a vehicle fluid pressure system was a spring set brake chamber having a service portion responsive to service fluid pressure metered thereto from a system fluid pressure source to effect normal service energization of said vehicle brakes and having an emergency or parking portion including resiliently urged means responsive to fluid pressure less than a predetermined value supplied thereto from said system fluid pressure source to mechanically actuate said service portion and effect emergency energization of said vehicle brakes. A push-pull control valve of a well-known type was connected between the emergency portion of the spring set brake chamber and the system fluid pressure source, and said push-pull control valve was operable between one position connecting the emergency portion of said spring set brake chamber in open pressure fluid communication with said system fluid pressure source to disable said resiliently urged means and another position interrupting pressure fluid communication therebetween and venting said emergency portion of said spring set brake chamber to the atmosphere to effect actuation of said resiliently urged means and simulate emergency energization of the vehicle brakes. One of the disadvantageous or undesirable features of such past push-pull control valves was that they did not afford the operator a "feel" as to the extent or intensity of the simulated emergency energization of the vehicle brakes. Another disadvantageous or undesirable feature of such past push-pull control valves was the inability thereof to meter or modulate in response to the operator-applied actuating force thereon.

The object of the present invention is to provide a control valve having push-pull type actuation which overcomes the aforementioned as well as other disadvantageous or undesirable features of such past push-pull control valves. This, as well as other objects and advantages of the present invention, will become apparent hereinafter.

Briefly, the invention embodies a control valve including a pair of applied force responsive application means movable in one direction to effect the application through said control valve of fluid pressure supplied thereto and movable in an opposite direction to isolate the applied fluid pressure, other means for following engagement with said application means and responsive to movement thereof in the other direction to effect a metered reduction of the applied fluid pressure to the atmosphere, said application means being responsive to the isolated supplied fluid pressure and the applied fluid pressure to provide a differential reaction force opposing movement of said application means in the opposite direction.

Figure 2:
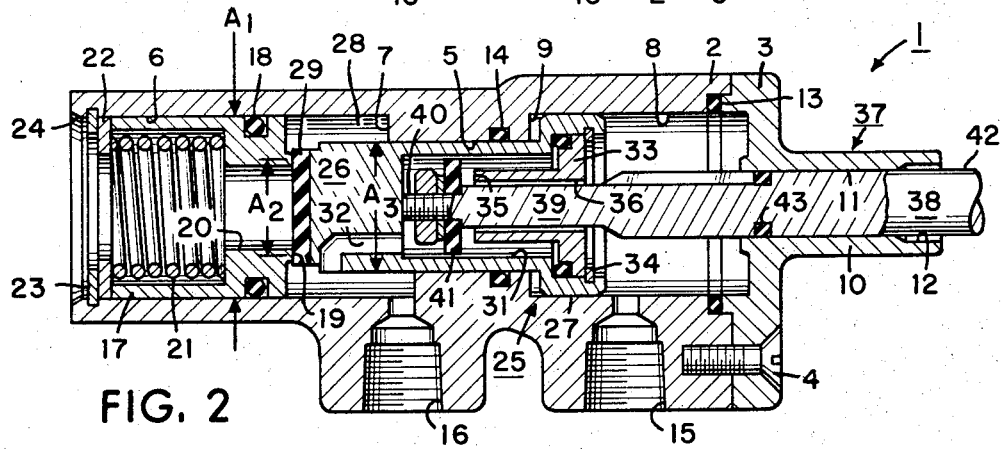
Figure 4:
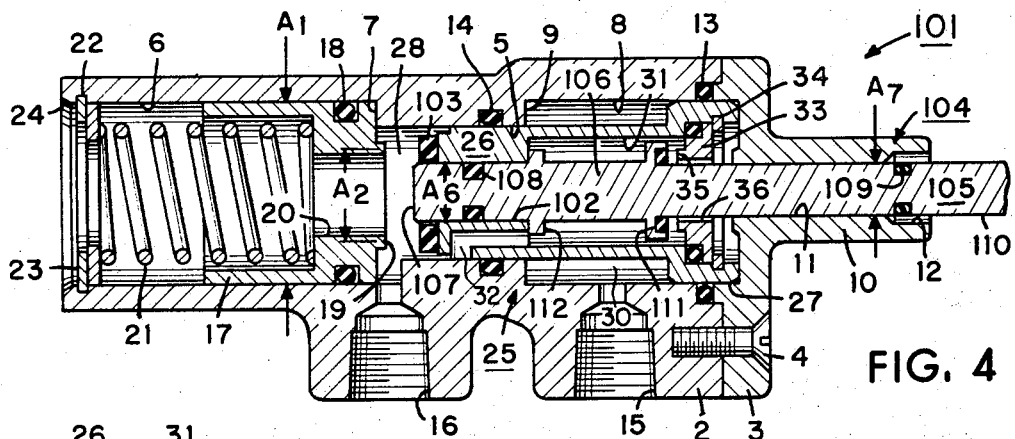
Figure 3:
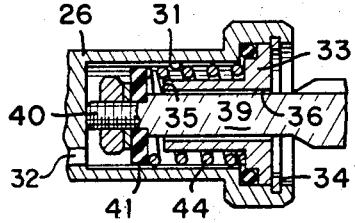

In the drawings which illustrate embodiments of the invention,

FIG. 1 is a sectional view showing a control valve embodying the present invention in the "out" position thereof in cross-section, FIG. 2 is another sectional view showing the control valve of FIG. 1 in the "in" position thereof in cross-section, FIG. 3 is a fragmentary view taken from FIG. 1 showing an alternate construction of the control valve in cross-section, and FIG. 4 is a sectional view showing another control valve embodying the present invention in cross-section.

Referring now to FIG. 1 in detail, a control valve 1 is provided with a housing 2 having an end cap or closure member 3 connected with the rightward end thereof by suitable means, such as a plurality of screws 4, and a bore and aligned counterbore 5, 6 are provided in said housing having a radially extending shoulder or abutment 7 at the juncture thereof. Another counterbore 8 is defined in the housing and end cap 2, 3 in alignment with the housing bore 5, and another radially extending shoulder 9 is provided on said housing at the juncture of said housing bore and counterbore 5, 8. The end cap 3 is provided with a centrally located hub or extension portion 10 having an axial bore 11 therethrough, said hub bore having the leftward end connecting with the housing counterbore 8 and a recess 12 provided in said hub adjacent to the rightward end thereof. An annular seal 13 is provided in the housing counterbore 8 between the housing and end cap 2, 3, and another annular seal 14 is provided in the housing bore 5. An inlet port 15 for connection with a fluid pressure source (not shown) is provided in the housing 2 intersecting the housing counterbore 8 between the housing shoulder 9 and the seal 13, and an outlet or delivery port 16 for connection with a fluid pressure responsive motor (not shown) is also provided in said housing intersecting with the housing bore and counterbore 5, 6 at the shoulder 7.

A metering or piston member 17 is slidably received in the housing counterbore 6 having a peripheral seal 18 therein in sealing engagement with said housing counterbore which defines a cross-sectional effective area $A_1$ of said metering piston 17. A valve seat 19 is provided in the rightward end of the metering piston 17 in circumscribing relation with a stepped metering or exhaust passage 20 axially provided through said metering piston, and said valve seat is provided with a cross-sectional effective area $A_2$. A metering spring 21 is biased between an annular retainer 22 and the metering piston 17 normally urging said metering piston toward engagement with the housing shoulder 7, said retainer being urged by said metering piston into displacement preventing engagement with a snap ring and groove assembly 23 provided in the leftward end of the housing counterbore 6 which also defines an exhaust port 24.

An application or valve member, indicated generally at 25, is provided with a piston-like stepped body 26, the smaller portion thereof being slidable in the housing bore 5 in sealing engagement with the seal 14 and the larger portion thereof being slidable in the housing counterbore 8 and having a peripheral surface 27 defining a valve element for sealing engagement with the housing seal 13. The valve member body 26 is provided with opposed cross-sectional effective areas $A_3$, $A_4$ respectively defined by the housing seal 13 when the valve member peripheral surface 27 is engaged therewith and by the housing seal 14, said area $A_4$ being larger than said area $A_3$. An outlet chamber 28 is defined in the housing bore and counterbore 5, 6 between the leftward end of the valve body 26 and the metering piston 17 in open pressure fluid communication with the outlet port 16 and normally vented to atmosphere through the metering piston exhaust passage 20, and a valve element 29 is carried in the leftward end of said valve body for sealing engagement with the metering piston valve seat 19. The valve body 26 also defines with the housing counterbore 8 an inlet chamber 30 between the housing shoulder 9 and the seal 13 in open pressure fluid communication with the inlet port 15 and isolating said inlet port when the valve body peripheral surface 27 is sealably engaged with said housing seal 13, and another effective area $A_5$ equal to the difference between areas $A_3$ and $A_4$ and opposing area $A_4$ is also provided on said valve member for subjection to the fluid pressure at said inlet port when said valve body peripheral surface is engaged with said housing seal. Of course, when the valve member peripheral surface 27 is disengaged from the housing seal 13, as described hereinafter, the effective area of the rightward end of the valve member 25 then becomes equal to the area $A_3$, i.e., the difference between areas $A_4$ and $A_5$. A blind bore 31 is axially provided through the rightward end of the valve body 26, and a passage 32 in said valve body connects the leftward end of said blind bore with the outlet chamber 28. The rightward end of the blind bore 31 is closed by a valve seating member 33 retained therein by a snap ring and groove assembly 34 provided in said blind bore adjacent to the rightward end thereof. The seating member 33 is provided with a valve seat 35 thereon facing the blind bore 31 and in circumscribing relation with a bore 36 axially extending through said seating member between said blind bore and the housing counterbore 8. It should be noted that the passage 32 and the blind bore 31 define a passage or chamber leftwardly or downstream of the seating member valve seat 35, and the seating member bore 36 defines another chamber or passage rightwardly or upstream of said seating member valve seat for connection with the downstream chamber 31, 32 between the outlet chamber 28 and the counterbore 8.

Another application or valve member, indicated generally at 37, is defined by a reciprocally movable control member or stem 38 which is slidably received in the hub bore 11 having a reduced portion or extension 39 which extends coaxially through the seating member bore 36 into the valve member blind bore 31, said reduced portion having an interior end or abutment 40 in said blind bore for driving abutting engagement with the valve member body 26. The stem 38 is movable between an "in" or charging position and an "out" or exhausting position (as shown in FIG. 1), and a valve element 41 is carried on the valve stem reduced portion 39 adjacent to the interior end 40 thereof for sealing engagement with the seating member valve seat 35 to isolate the outlet port and chamber 16, 28 and the downstream chamber 31, 32 of the valve member 25 from the upstream chamber 36 thereof. The stem 38 is provided with a force receiving or exterior end 42 externally of the end cap 3, and an annular seal 43 is carried on said stem near the mid-portion thereof for sealing engagement with the end cap bore 11, said seal 43 being disengaged from the end cap bore 11 in the "out" position of the stem to effect the exhaustion of the upstream chamber 36 of the valve member 25 and the portion of the counterbore 8 rightwardly of said valve member to atmosphere through said end cap bore and said seal 43 also being movable into engagement with said end cap bore in the "in" position of said stem to isolate said upstream chamber and said counterbore from the atmosphere, as described hereinafter.

In the operation of the control valve 1 with the component parts thereof positioned as above described and as shown in FIG. 1, an operator-applied force on the exterior end 42 of the stem 38 moves said stem leftwardly to sealably engage the seal 43 with the hub bore 11 isolating the valve member downstream chamber 36 and the portion of the counterbore 8 rightwardly of the valve member 25 from the atmosphere and to disengage the valve element 41 from the seating member valve seat 35 thereby connecting the valve member downstream chamber 31, 32 in open pressure fluid communication with the valve member upstream chamber 36, as shown in FIG. 2. Further leftward movement of the stem 38 drivingly engages the interior end 40 thereof with the valve member body 26 to thereafter concertedly move said valve member body leftwardly in the housing bore and counterbore 5, 8 against a force $F_1$ of the fluid pressure at the inlet port 15 acting on the area $A_5$. The concerted leftward movement of the valve member body 26 disengages the peripheral surface 27 thereof from the housing seal 13, and upon such disengagement, the force $F_1$ is eliminated since the counterbore 8 rightwardly of said valve member body is now also subjected to the fluid pressure at the inlet port 15. At the same time, the leftward movement of the valve member body 26 engages the valve element 29 with the metering piston valve seat 19 to close the metering piston exhaust passage 20. With the metering piston exhaust passage 20 closed, the fluid pressure flows from the inlet port 15 through the housing counterbore 8 and the upstream and downstream chambers 36 and 31, 32 of the valve member 25 into the outlet chamber 28 and the outlet port 16. The established fluid pressure at the outlet port 16 and in the outlet chamber 28 acts on the difference of the effective areas $A_1$ and $A_2$ of the metering piston 17 to create a force $F_2$ urging said metering piston leftwardly in the housing counterbore 6 against the compressive force of the metering spring 21 and into abutment with the retainer 22.

Since the valve element 29 is engaged with the metering piston valve seat 19, the effective area $A_3$ of the leftward end of the valve member 25 is reduced by the area $A_2$ defined by said valve seat; therefore, the fluid pressure at the outlet port acts on the difference of the effective areas $A_2$ and $A_3$ while the fluid pressure at the inlet port acts on the opposing effective area $A_3$ of the rightward end of said valve member creating a differential force $F_3$ which is additive to the applied force to urge said valve member leftwardly in following engagement with the metering piston 17 until said metering piston engages the retainer 22, as previously mentioned. At this time, the applied force may be removed from the exterior end 42 of the stem 38, and the differential force $F_3$ across the valve member 25 will maintain said valve member in the "in" position thereof while the force $F_2$ maintains the metering piston in the "in" position thereof, as shown in FIG. 2.

In the event the operator desires to decrease or exhaust the fluid pressure at the outlet port 16, a rightwardly directed manual force is applied on the exterior end 42 of the stem 38 to move said stem toward the "out" position thereof. This rightward movement of the stem 38 sealably engages the valve element 41 thereon with the seating member valve seat 35 to interrupt pressure fluid communication between the valve member upstream and downstream chambers 36 and 31, 32 which isolates the outlet port 16 from the inlet port 15 and then urges the valve member 25 rightwardly in concert with said stem. The concerted rightward movement of the stem 38 and valve member 25 initially disengages the valve element 29 from the metering piston valve seat 19 to establish limited pressure fluid communication between the outlet and exhaust ports 16, 24 and thereby effect metered pressure fluid flow from said outlet port through the outlet chamber 28, the metering piston exhaust passage 20 and the housing counterbore 6 to the atmosphere. The reduction of the fluid pressure in the outlet chamber 28 effects a corresponding reduction of the force $F_2$ which permits the compressive force of the metering spring 21 to urge the metering piston 17 rightwardly in follow-up relation with the valve member 25 and move the metering piston valve seat 19 into lapped engagement with the valve element 29. Since the engagement of the stem valve element 41 with the seating member valve seat 35 isolates the inlet port 15 from the outlet port 16, the reduced fluid pressure at said outlet port also effects an increase in the differential force $F_3$ in opposition to the applied force to provide the operator with a "feel" as to the extent of the exhaustion of fluid pressure or as to the extent of the actuation of the fluid pressure responsive device (not shown) associated with the outlet port 16. If further actuation is desired, the rightward manually applied force on the stem 38 is increased which results in a further increase in the differential force $F_3$ in opposition thereto, and the component parts of the control valve 1 function in the same manner as previously described to again move the metering piston valve seat 19 into lapped engagement with the valve element 29.

If the operator now desires to completely exhaust the outlet port 16, the rightwardly directed manually applied force on the stem 38 is increased to overcome the differential force $F_3$ and concertedly move the valve member 25 and said stem rightwardly to their original or "out" positions. The initial concerted rightward movement of the valve member 25 and stem 38 sealably reengages the valve member peripheral surface 27 with the housing seal 13 to isolate the inlet port 15 from the portion of the housing counterbore 8 rightwardly of said valve member, and further rightward concerted movement of said valve member and stem disengages the stem seal 43 from the hub bore 11 to vent the upstream chamber 36 of said valve member and the portion of the counterbore 8 rightwardly of said valve member to the atmosphere through said hub bore. At the same time, the rightward movement of the valve member 25 in response to the applied force also moves the valve element 29 thereof to its original position disengaged from the metering piston valve seat 19 to completely exhaust fluid pressure from the outlet port 16, as previously described, and the exhaustion of fluid pressure from the outlet port eliminates the force $F_2$ permitting the metering spring 21 to move the metering piston 17 to its original position in abutment with the housing shoulder 7. It is apparent that the exhaustion of the outlet port 16 and the portion of the counterbore 8 rightwardly of the valve member 25, as previously mentioned, eliminates the differential force $F_3$, and the fluid pressure at the inlet port 15 again acts on the area $A_5$ of the valve member 25 to re-establish the force $F_1$ which maintains said valve member in its original or "out" position.

Referring now to FIG. 3, an alternative construction of the control valve 1 is shown wherein a return spring 44 is provided in the valve member blind bore 31 biased between the valve element 41 and the seating member 33 urging said valve element to its normal or "out" position disengaged from the seating member valve seat 35 and establishing pressure fluid communication between the upstream and downstream chambers 36 and 31, 32 of the valve member 25.

Referring now to FIG. 4, another control valve 101 is shown having substantially the same component parts as the previously described control valve 1 with the following exceptions. In the control valve 101, the valve member body 26 is provided with another axial bore 102 extending through the leftward end thereof and connecting with the blind bore 31, and an annular valve element 103 is provided on the leftward end of the valve member body 26 in circumscribing relation with the valve member bore 102 and for sealing engagement with the metering piston valve seat 19.

An application or valve member, indicated generally at 104, is defined by a reciprocally movable member or stem 105 which is slidably received in the hub bore 11 and which extends coaxially through the housing at counterbore 8 and the seating member bore 36, and an enlarged portion or extension 106 is integrally provided on said stem, said extension being slidably received in the valve member bore 102 and having an interior end 107 aligned with the metering piston passage 20. An annular seal 108 is carried on the stem extension 106 adjacent the interior end thereof in sealing engagement with the valve member bore 102, and another annular seal 109 is carried on the stem 105 adjacent to the exterior end 110 thereof for sealing engagement with the hub bore 11, said seal 109 being disengaged from said hub bore in the "out" position of said stem and being engaged with said bore in the "in" position of said stem. A valve element 111 is also provided on the stem 105 for sealing engagement with the seating member valve seat 35, and a radially extending shoulder or abutment flange 112 is provided on the stem extension 106 between said valve element and the seal 109 for abutting driving engagement with the valve member body 26 about the rightward end of the bore 102 therein. It should be noted that the effective cross-sectional area $A_6$ of the stem extension 106 defined by the seal 108 is greater than the effective cross-sectional area $A_7$ of the stem 105 defined by the seal 109.

The operation of the control valve 101 is essentially the same as that previously described for the control valve 1 except that the flange 112 is moved into driving engagement with the valve member body 26 in response to the operator-applied force for moving the stem 105 and valve member 25 from the "out" to the "in" position thereof. In the "in" position the interior end 107 of the stem extension 106 is exposed to atmosphere as is the exterior end 110 of the stem 105; therefore, since the effective area $A_6$ of said stem extension is greater than the effective Area $A_7$ of said stem, the fluid pressure at the inlet port 15 acts on the difference of the areas $A_6$ and $A_7$ to establish a force $F_4$ which urges said stem and extension leftwardly to maintain the valve element 111 thereof disengaged from the seating member valve seat 35.

From the foregoing, it is now apparent that novel control valves 1 and 101 meeting the objects set out hereinbefore are provided and that changes or modifications as to the precise configurations, shapes or details of the constructions and operations thereof set forth in the disclosure by way of illustration may be made by those skilled in the art without departing from the spirit of the invention, as defined by the claims which follow.

The embodiments of the invention in which an exclusive property or privilege is claimed are defined as follows:

1. A control valve comprising a housing, a pair of application means movable in said housing in response to an applied force in one direction to effect the application of fluid pressure supplied thereto through said housing and in another direction to isolate the supplied fluid pressure from the applied fluid pressure, resiliently urged metering means for following engagement with one of said application means and responsive to movement of said application means in the other direction to effect metered reduction of only the applied fluid pressure, and opposed areas on said one application means respectively responsive to the reduced applied fluid pressure and the isolated supplied fluid pressure to establish a reaction force in opposition to the applied force in the other direction.

2. A control valve comprising a housing, a pair of application means movable in response to an applied force in one direction in said housing to effect the application therethrough of fluid pressure supplied to said housing and movable in response to another applied force in another direction in said housing to isolate the fluid pressure supplied thereto from that applied through said housing, means for controlling communication between the applied fluid pressure and the atmosphere including metering means movable in said housing for engagement with one of said application means, said metering means being engaged and moved by said one application means upon movement thereof in the one direction to a position isolating the applied fluid pressure from the atmosphere, and resilient means urging said metering means in follow-up relation with said one application means upon movement of said application means in the other direction to meter the applied fluid pressure to the atmosphere and reduce the magnitude thereof, and opposed areas on said one application means respectively responsive to the isolated supplied fluid pressure and the reduced applied fluid pressure upon movement of said aplication means in the other direction to establish a differential reaction force in opposition to the other applied force.

3. A control valve comprising a housing, a pair of application means movable in response to the applied force in one direction toward positions in said housing effecting the application therethrough of fluid pressure supplied to said housing and in another direction toward other positions in said housing isolating the fluid pressure supplied to said housing from that applied therethrough, other means movable in said housing for engagement with one of said application means, passage means in said other means for communicating the applied fluid pressure with the atmosphere, said passage means being closed upon the applied force movement of said pair of application means in the one direction to engage said one application means with said other means, an area on said other means and responsive to the applied fluid pressure for moving said other means in the one direction with said one application means when said passage means is closed, said one application means also being movable relative to said other means upon the applied force movement of said pair of application means in the other direction to open said passage means and communicate the applied fluid pressure with the atmosphere reducing the magnitude thereof, resilient means opposing movement of said other means in the one direction and responsive to the reduced applied fluid pressure acting on said area to move said other means in the other direction into follow-up engagement with said one application means again closing said passage means, and other opposed areas on said one application means respectively responsive to the isolated supplied fluid pressure and the reduced applied fluid pressure to establish a differential reaction force in opposition to the applied force movement of said pair of application means in the other direction.

4. A control valve comprising a housing having a pair of ports therein, a pair of valve members movable in said housing in response to an applied force in one direction to positions establishing pressure fluid communication between said ports and in another direction to positions interrupting pressure fluid communication between said ports and isolating the fluid pressure therebetween, metering means for following engagement with one of said valve members and controlling pressure fluid communication between one of said ports and the atmosphere, resilient means urging said metering means into following engagement with said one valve member to effect metered reduction of the fluid pressure at said one port upon the movement of said valve members in the other direction, and opposed areas on said one valve member respectively responsive to the reduced fluid pressure at said one port and the isolated fluid pressure at said other port to establish a reaction force in opposition to the applied force movement of said valve members in the other direction.

5. A control valve comprising a housing having inlet, outlet and exhaust ports therein, first, second and third valve members movable in said housing for controlling pressure fluid communication between said ports, said valve members being movable in response to an applied force in one direction to positions establishing pressure fluid communication between said inlet and outlet ports and interrupting pressure fluid communication between said outlet and exhaust ports, said first and second valve members also being movable relative to said third valve member in an opposite direction in response to another applied force to positions isolating the fluid pressure at said inlet port from that at said outlet port and establishing pressure fluid communication between said outlet and exhaust ports to effect a reduction of the fluid pressure at said outlet port, and resilient means for urging said third member in the opposite direction in following relation with said first and second valve members upon the reduction of the fluid pressure at said outlet port to another position again interrupting pressure fluid communication between said outlet and exhaust ports, and opposed areas on one of said first and second valve members respectively responsive to the reduced fluid pressure at said outlet port and that isolated at said inlet port upon movement of said valve members in the opposite direction to establish a differential reaction force in opposition to the other applied force.

6. A control valve comprising a housing having a pair of ports therein, a pair of valve members movable in said housing, one of said valve members normally interrupting pressure fluid communication between said pair of ports, metering means for following engagement with said one valve member and normaly establishing pressure fluid communication between one of said ports and the atmosphere, said pair of valve members being concertedly movable in response to an applied force in one direction to positions establishing pressure fluid communication between said pair of ports and engaging said one valve member with said metering means to also effect concerted movement thereof to a position interrupting pressure fluid communication between said one port and the atmosphere, said pair of valve members being thereafter concertedly movable in response to another applied force in an opposite direction to positions interrupting pressure fluid communication between said pair of ports to isolate the fluid pressure at the other of said ports from that at said one port and also disengaging said one valve member from said metering means to re-establish pressure fluid communication between said one port and the atmosphere and reduce the fluid pressure at said one port, resilient means urging said metering means in the other direction and into follow-up engagement upon the reduction of fluid pressure at said one port to again interrupt pressure fluid communication between said one port and the atmosphere, first and second opposed effective areas on said one valve member respectively responsive to fluid pressure at said pair of ports upon the applied force movement of said pair of valve members in the other direction, and another effective area on the other of said valve members additive to one of said first and second opposed areas of said one valve member and responsive to the fluid pressure at said one port upon the applied force movement of said pair of valve members in the other direction, the fluid pressure at said other port acting on the other of said first and second areas and the reduced fluid pressure at said one port acting on said other area and said one of said first and second areas to establish a differential force opposing movement of said pair of valve members in the other direction in response to the other applied force.

7. A control valve comprising a housing having a pressure fluid flow passage therethrough, a pair of application means movable in said housing and defining therewith first and second portions of said flow passage, said pair of application means being movable in response to an applied force in one direction to effect the application of fluid pressure through said first and second flow passage portions, other means defining with one of said application means another portion of said flow passage connected with one of said first and second flow passage portions and movable in said housing for controlling pressure fluid communication between said other flow passage portion and the atmosphere, said other means being engaged and moved by said one application means upon the movement thereof in the one direction to a position isolating said other flow passage portion from the atmosphere, resilient means urging said other means toward following engagement with said one application means, said pair of application means also being movable in response to another applied force in an opposite direction to positions isolating the fluid pressure in said first portion from that in said second portion and disengaging said one application means from sad other means to meter fluid pressure from said other portion to the atmosphere and reduce the fluid pressure therein, and opposed effective areas on said pair of application means respectively responsive to the reduced fluid pressure in said other portion and the isolated fluid pressure in said other of said first and second portions to establish a differential reaction force opposing movement of said pair of application means in the opposite direction in response to the other applied force.

8. A control valve comprising a housing having a pair of ports therein, a valve member movable in said housing and normally closing one of said ports from the other of said ports, a control member reciprocally movable in said housing for driving engagement with said valve member, a metering member movable in said housing for engagement with said valve member, said control member being initially movable in response to an applied force in one direction to drivingly engage and move said valve member into engagement with said metering member and thereafter concertedly move said valve member and metering means toward an applied position, said one port being opened upon movement of said valve member in the one direction toward the applied position, passage means in said valve member providnig pressure fluid flow between said ports upon the movement of said valve member toward the applied position thereof, other passage means in said metering member normally venting said other port to the atmosphere and being closed upon the engagement of said valve member and said metering member, a valve seat on said valve member about said first named passage means, valve means on said control member for engagement with said valve seat, said control member being initially moveable in another direction opposite the one direction in response to another applied force to engage said valve means with said valve seat closing said first named passage and isolating the fluid pressure at said one port from that at said other port and said valve member being thereafter concertedly movable with said control member in the other direction to a position disengaged from said metering member to open said other passage means and reduce the fluid pressure at said outlet port, spring means opposing movement of said metering means in the one direction and urging said metering means in the other direction into follow-up engagement with said valve member upon the reduction of the fluid pressure at said other port to again close said other passage means, and opposed areas on said valve member respectively responsive to the reduced fluid pressure at said other port and the isolated fluid pressure at said one port to establish a differential reaction force in opposition to the other applied force and further concerted movement of said valve member and control member in the other direction.

9. The control valve according to claim 8 wherein said control member includes a portion slidable in said valve member, the opposed ends of said control member being subjected to atmospheric pressure, and other opposed effective areas on said control member responsive to the fluid pressure at one of said ports to establish another differential force urging said valve means from engagement with said valve seat.

10. A control valve comprising a housing having a pair of ports therein, a seal in said housing, a valve member movable in said housing, a sealing portion on said valve member normally engaged with said housing seal to close one of said ports from the other of said ports, passage means in said valve member for connection between said ports, a pair of spaced abutments in said housing, a metering member movable in said housing between said spaced abutments, spring means urging said metering member into engagement with one of said spaced abutments and toward engagement with said valve member, other passage means in said metering member normally venting said other port to the atmosphere, a valve seat on said metering member in circumscribing relation with said other passage means, a valve element on said valve member for engagement with said valve seat, a control member movable in said housing and extending into said first named passage means, an abutment portion on said control member for driving engagement with said valve member, said control member being initially movable in one direction in response to an applied force to drivingly engage said abutment portion with said valve member and concertedly move said valve member to engage said valve element with said valve seat closing said other passage means and disengaging said sealing portion from said housing seal to open said one port and establish pressure fluid communication between said ports through said first named passage means, and said control member, valve member and metering member being thereafter concertedly movable in the one direction against said spring means to a position engaging said meterig meas with the other of said spaced abutments, another valve seat on said valve member in circumscribing relation with said first named passage means, another valve element on said control member for sealing engagement with said other valve seat, said control member also being initially movable in a direction opposite the one direction to engage said other valve element with said other valve seat closing said first named passage means and isolating the fluid pressure at said one port from that at said other port and said control member being thereafter further movable in the opposite direction to concertedly move said valve member to a position disengaging said first named valve element from said first named valve seat to open said other passage means and reduce the fluid pressure at said other port, said spring means urging said metering member in the opposite direction from engagement with said other spaced abutment and in follow-up relation with said valve member upon the reduction of fluid pressure at said other port to sealably re-engage said first named valve seat with said first named valve element and again close said other passage means, and opposed areas on said valve member respectively responsive to the reduced fluid pressure at said other port and the isolated fluid pressure at said one port to establish a differential reaction force across said valve member in opposition to further concerted movement thereof with said control member in the opposite direction.

11. The control valve according to claim 1, wherein one of said opposed areas is larger than the other thereof, said one and other areas being subjected to the supplied and applied fluid pressures to establish a differential force additive to the applied force in the one direction to maintain said one appplication means in its position effecting the application of the supplied fluid pressure through said housing when the applied force in the one direction is eliminated.

12. The control valve according to claim 11, comprising an effective metering area on said resiliently urged means for subjection to the applied fluid pressure, said metering area being responsive to the applied fluid pressure to establish a force in the one direction to obviate movement of said resiliently urged means against said one application means when the applied force in the one direction is eliminated.

13. The control valve according to claim 1, comprising an effective metering area on said resiliently urged means for subjection to the applied fluid pressure, said metering area being responsive to the applied fluid pressure acting thereon to establish a force opposing movement of said resiliently urged means toward following engagement with said one application means upon the applied force movement thereof in the other direction.

14. The control valve according to claim 1, comprising metering passage means in said resiliently urged means for communicating the applied fluid pressure with the atmosphere, said metering passage being closed when said resiliently urged means is engaged with said one application means.

15. The control valve according to claim 14, wherein said resiliently urged means includes piston means movable in said housing, said piston means being engaged and moved by said one application means upon the applied force movement thereof in the one direction toward a position in said housing isolating the applied fluid pressure from the atmosphere, and resilient means urging said piston means toward following engagement with said one application means to effect the metered reduction of the applied fluid pressure upon the applied force movement of said one application means in the other direction, said metering passage means extending through said piston means.

16. The control valve according to claim 14, comprising a valve seat on said resiliently urged means in circumscribing relation with said metering passage means, said one application means being movable in response to the applied force in the one direction into engagement with said valve seat to close said metering passage means.

17. The control valve according to claim 16, comprising valve means on said one application means for engagement with said valve seat.

18. The control valve according to claim 1, wherein said application means and resiliently urged means define with said housing a pressure fluid flow passage therethrough, the applied force movement of said application means in the one direction into engagement with said resiliently urged means effecting the application of the supplied fluid pressure through said flow passage and the applied force movement of said application means in the other direction interrupting pressure fluid flow through said flow passage and isolating the supplied fluid pressure from the applied fluid pressure.

19. The control valve according to claim 18, comprising a valve seat on said one application means in circumscribing relation with said flow passage, valve means on the other of said application means for engagement with said valve seat, said valve means being movable toward a position disengaged from said valve seat to effect the application of the supplied fluid pressure through said flow passage upon the applied force movement of said application means in the one direction and being movable toward a position engaged with said valve seat to close said flow passage and isolate the supplied fluid pressure from the applied fluid pressure upon the applied force movement of said application means in the other direction.

20. The control valve according to claim 19, comprising a driving connection between said application means to effect the concerted applied force movement thereof in the one direction, the engagement of said valve means and valve seat defining another driving connection between said application means to effect the concerted applied force movement thereof in the other direction.

21. The control valve according to claim 1, comprising a driving portion on the other of said application means for driving engagement with said one application means, said other application means being movable in response to the applied force in the one direction to drivingly engage said driving portion with said one application means and effect the concerted applied force movement of said one and other application means in the one direction, and another driving portion on said other application means for driving engagement with said one application means, said other application means being movable in response to the applied force in the other direction to disengage said first named driving portion from said one application means and drivingly engage said other driving portion with said one application means and effect the concerted applied force movement of said one and other application means in the other direction.

22. The control valve according to claim 20, comprising another valve seat in said housing for selective engagement with said one application means to control pressure fluid flow through said flow passage, said one application means being normally engaged with said other valve seat to isolate the supplied fluid pressure in a portion of said flow passage, another portion of said flow passage defined between said first named and other valve seats for selective connection with said first named flow passage portion and the atmosphere, a third valve seat in said housing for selective engagement with said other application means to control pressure fluid communication between said other flow passage portion and the atmosphere, said other application means being normally disengaged from said third valve seat to vent said other flow passage portion to the atmosphere, said other application means being initially movable in response to the applied force in the one direction into engagement with said third valve seat and disengaging said first valve means from said first valve seat and thereafter further movable to effect the driving connection with said one application means for applied force concerted movement in the one direction, said one application means being concertedly movable in the one direction with said application means toward a position disengaged from said other valve seat interconnecting said one and other flow passage portions and engaged with said resiliently urged means to effect the application of the applied fluid pressure through said flow passage.

23. The control valve according to claim 1, comprising a pair of spaced abutments on said housing for engagement with said one application means to limit the applied force movement thereof in the one and other directions, respectively, means on said housing between said spaced abutments defining another valve seat for engagement with said one application means, said one application means being movable toward engagement with one of said spaced abutments and into sealing engagement with said other valve seat to isolate the supplied fluid pressure in a portion of said flow passage upon the concerted applied force movement of said application means in the other direction, a third abutment on said housing for engagement with said resiliently urged means to limit the following engagement thereof with said one application means in the other direction, said resiliently urged means being biased into engagement with said third abutment and said one application means being disengaged from said resiliently urged means when engaged with said other valve seat to completely exhaust the applied fluid pressure to the atmosphere, and exhaust passage means in said resiliently urged means for exhausting the applied fluid pressure to the atmosphere when said one application means is disengaged from said resiliently urged means.

24. The control valve according to claim 23, comprising a holding effective area on said one application means responsive to the isolated supplied fluid pressure to establish a holding force in opposition to the applied force in the one direction when said one application means is engaged wtih said other valve seat, the opposed areas on said one application means being vented to atmosphere when said one application means is engaged with said other valve seat.

References Cited

UNITED STATES PATENTS

| | | | |
|---|---|---|---|
| 3,107,693 | 10/1963 | Puster | 137—627.5 X |
| 3,109,456 | 11/1963 | Horowitz | 137—627.5 |
| 3,168,353 | 2/1965 | Horowitz | 303—71 |
| 3,224,815 | 12/1965 | Horowitz | 137—609 |

CLARENCE R. GORDON, *Primary Examiner.*